United States Patent
Kleyer et al.

(10) Patent No.: US 11,952,819 B2
(45) Date of Patent: *Apr. 9, 2024

(54) VEHICLE SIDE WINDOW HAVING A RETAINING ELEMENT ATTACHED ON ONE SIDE

(71) Applicant: SAINT-GOBAIN GLASS FRANCE, Courbevoie (FR)

(72) Inventors: Dieter Kleyer, Würselen (DE); Jan-Uwe Oltrogge, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/772,372

(22) PCT Filed: Oct. 29, 2018

(86) PCT No.: PCT/EP2018/079562
§ 371 (c)(1),
(2) Date: Jun. 12, 2020

(87) PCT Pub. No.: WO2019/115080
PCT Pub. Date: Jun. 20, 2019

(65) Prior Publication Data
US 2021/0079709 A1    Mar. 18, 2021

(30) Foreign Application Priority Data
Dec. 12, 2017 (EP) .................................. 17206583

(51) Int. Cl.
*B60J 1/16* (2006.01)
*B60J 1/00* (2006.01)
(Continued)

(52) U.S. Cl.
CPC .............. *E05F 11/385* (2013.01); *B60J 1/006* (2013.01); *B60J 1/17* (2013.01); *E05D 15/165* (2013.01);
(Continued)

(58) Field of Classification Search
CPC .......... E05F 11/385; E05F 11/38; B60J 1/006; B60J 1/17; B60J 1/16; E05D 15/165; E05Y 2201/64; E05Y 2900/55; E05Y 2600/526
(Continued)

(56) References Cited

U.S. PATENT DOCUMENTS 3,832,274 A  *  8/1974  Owston ................. C08F 265/00
                                                428/462
4,026,088 A  *  5/1977  Akabane ............... E05F 11/385
                                                52/716.5
(Continued)

FOREIGN PATENT DOCUMENTS

CN    101432158 A    5/2009
CN    107208442 A    9/2017
(Continued)

OTHER PUBLICATIONS

International Search Report as issued in International Patent Application No. PCT/EP2018/079562, dated Jan. 31, 2019.

*Primary Examiner* — Jerry E Redman
(74) *Attorney, Agent, or Firm* — Pillsbury Winthrop Shaw Pittman LLP

(57) ABSTRACT

A side window for a vehicle, having a first surface, a second surface opposite thereto, and a lower edge, and having at least one retaining element attached in the region of the lower edge, wherein the retaining element has a contact section with a contact surface for securing to the side window and a securing section connected to the contact (Continued)

section for securing to the vehicle, and wherein the retaining element is secured to the side window on one side, by connecting the contact surface to the first surface via an adhesive, wherein the adhesive has a thickness of at least 1 mm and a modulus of elasticity of at least 150 MPa.

9 Claims, 4 Drawing Sheets

(51) Int. Cl.
  *B60J 1/17* (2006.01)
  *E05D 15/16* (2006.01)
  *E05F 11/38* (2006.01)
(52) U.S. Cl.
  CPC ....... *E05Y 2201/64* (2013.01); *E05Y 2900/55* (2013.01)
(58) Field of Classification Search
  USPC .................................................... 49/374, 375
  See application file for complete search history.

(56) References Cited

U.S. PATENT DOCUMENTS

| | | | | |
|---|---|---|---|---|
| D273,560 S * | 4/1984 | Akabane | ........................ | D8/354 |
| 4,663,901 A * | 5/1987 | Ichinohe | ............... | E05F 11/385 52/127.3 |
| 4,762,904 A | 8/1988 | Nakama | | |
| 4,803,257 A * | 2/1989 | Goel | ........................ | C08G 18/10 528/45 |
| 4,987,699 A * | 1/1991 | Gold | ........................ | B60J 10/34 49/375 |
| 5,513,468 A * | 5/1996 | Diestelmeier | ......... | E05F 11/385 49/351 |
| 5,765,310 A * | 6/1998 | Gold | .......................... | B60J 1/17 49/375 |
| 5,987,820 A * | 11/1999 | Shibanushi | ........... | E05F 11/445 49/375 |
| 6,349,504 B1 * | 2/2002 | Schmitt | ................ | E05F 11/385 49/375 |
| 6,425,207 B1 * | 7/2002 | Davis | .................... | E05F 11/385 49/349 |
| 8,171,682 B2 * | 5/2012 | Pulcini | .................. | E05F 11/385 52/208 |
| 8,209,908 B2 * | 7/2012 | Mori | ..................... | E05F 11/385 49/374 |
| 9,970,226 B2 * | 5/2018 | Stewart | ................. | E05F 15/689 |
| 10,487,558 B2 * | 11/2019 | Walawender | ............ | B60J 1/006 |
| 10,851,575 B2 * | 12/2020 | Takahashi | ............. | E05D 15/165 |
| 10,883,299 B2 * | 1/2021 | Walawender | ................ | B60J 1/17 |
| 2003/0093960 A1 * | 5/2003 | Mizusawa | ............. | E05F 11/385 52/204.62 |
| 2003/0110702 A1 * | 6/2003 | Capriotti | ............... | E05F 11/385 49/375 |
| 2003/0196384 A1 * | 10/2003 | Kang | .................... | E05F 11/385 49/375 |
| 2010/0037543 A1 * | 2/2010 | Pulcini | .................. | E05F 11/385 52/208 |
| 2017/0284140 A1 * | 10/2017 | Sase | ....................... | E05F 11/385 |
| 2017/0306677 A1 * | 10/2017 | Kosaka | ................. | E05F 11/385 |
| 2018/0202209 A1 * | 7/2018 | Koette | ................... | E05F 11/385 |
| 2019/0178019 A1 * | 6/2019 | Takahashi | .................. | B60J 1/17 |
| 2021/0071459 A1 * | 3/2021 | Kleyer | .................. | E05F 11/385 |
| 2021/0079708 A1 * | 3/2021 | Kleyer | ....................... | B60J 1/17 |
| 2021/0079709 A1 * | 3/2021 | Kleyer | ..................... | B60J 1/006 |

FOREIGN PATENT DOCUMENTS

| | | |
|---|---|---|
| DE | 33 20 157 A1 | 12/1984 |
| DE | 43 40 363 A1 | 6/1995 |
| DE | 10 2011 011600 A1 | 8/2012 |
| EP | 1 038 711 A2 | 9/2000 |
| EP | 1 299 611 A2 | 4/2003 |
| EP | 1 745 190 A1 | 1/2007 |
| EP | 1 935 557 A1 | 6/2008 |
| EP | 1 935 558 A1 | 6/2008 |
| EP | 1 936 086 A1 | 6/2008 |
| EP | 1 936 087 A1 | 6/2008 |
| GB | 2 297 783 B | 8/1996 |
| JP | S59-169323 U | 11/1984 |
| JP | 2004-324351 A | 11/2004 |
| JP | 2006-274679 A | 10/2006 |
| JP | 2007-146458 A | 6/2007 |
| RU | 2133811 C1 | 7/1999 |
| RU | 2522535 C2 | 7/2014 |
| WO | WO 01/98613 A2 | 12/2001 |
| WO | WO 2005/098187 A1 | 10/2005 |
| WO | WO 2016/204978 A1 | 12/2016 |

* cited by examiner

A - A'

Providing a retaining element 1 having a contact section 2 and, connected thereto via a step section 5, a securing section 3 that has a filling opening 6 and channels 4 in the contact surface 2a directed toward the filling opening 6

↓

Arranging the retaining element 1 relative to a side window I, with the contact surface 2a of the retaining element 1 and the first surface Ia of the side window I facing one another with a distance of 3 mm between them

↓

Injecting an adhesive 9 with a modulus of elasticity of 400 MPa through a filling opening 6 of the retaining element 1

Fig. 7

Providing a retaining element 1 having a contact section 2 and, connected thereto via a step section 5, a securing section 3

↓

Applying an adhesive 9 with a modulus of elasticity of 400 MPa and a thickness of 4 mm on the contact surface 2a of the retaining element 1

↓

Pressing the contact section 2 onto a side window I

Fig. 8

VEHICLE SIDE WINDOW HAVING A RETAINING ELEMENT ATTACHED ON ONE SIDE

CROSS-REFERENCE TO RELATED APPLICATIONS

This application is the U.S. National Stage of PCT/EP2018/079562, filed Oct. 29, 2018, which in turn claims priority to European patent application number 17 206 583.1 filed Dec. 12, 2017. The content of these applications are incorporated herein by reference in their entireties.

FIELD

The invention relates to a vehicle side window having a retaining element attached on one side, a method for its production, and use thereof.

BACKGROUND

Motor vehicles typically have openable side windows. Such side windows are provided with a side pane that can be moved by substantially vertical displacement (i.e., raising and lowering), by which means the side window can be opened and closed. In order to be able to move the window, it is connected to a mechanism in the interior of the vehicle body.

For connecting the side window to the raising and lowering mechanism, the side window can be provided with one or a plurality of holes in the region of its lower edge. Alternatively, one or a plurality of retaining elements can also be attached, in particular glued, to the side window in the region of the lower edge. Such retaining elements usually have a substantially Y-shaped cross-section with two contact sections that are glued to the two surfaces of the side window and to which a common securing section is connected via a step in each case. The securing section is connected to the lower edge of the side window and is equipped with a hole for connecting to the raising and lowering mechanism. Such Y-shaped retaining elements are known, for example, from EP1936088A1, EP1936087A1, EP1935557A1, EP1935558A1, EP1745190A1, EP1299611A2, and DE4340363A1.

Typically, prior art Y-shaped retaining elements are placed on the lower edge of the side window. Then, the adhesive is applied, in particular, through filling openings in the contact sections. To prevent escape of the adhesive from the intermediate space between the contact section and the pane surface, it is necessary to seal this intermediate space with a sealing device that rests against the side edges of the contact sections. Alternatively, leaked adhesive can be removed in a subsequent step. Both the use of the sealing element and the subsequent removal of leaked adhesive make the attachment of the retaining element complex.

The orientation of the attached retaining element depends essentially on the curvature of the pane in the edge region, which, for its part, is subject to certain production-related variation. As a result of the securing section extending lever-like from the lower edge of the pane, the position of the connection to the raising and lowering mechanism is also subject to variation and can sometimes deviate significantly from the intended position. This can result in production rejects.

DE102011011600A1 proposes a retaining element to be attached on one side which enables greater flexibility in terms of its positioning as a result of which tolerances can be compensated and variations can be reduced. The retaining element has only a single contact section, which is on one of the pane surfaces, whereas no section of the retaining element is associated with the opposite pane surface. However, the connection of the retaining element to the side window on only one side reduces the stability of the assembly, adversely affecting overall stiffness in particular.

DE3320157A1 discloses a retaining element to be attached on one side, whose contact surface is implemented with depressions, incisions, or perforations in order to increase the contact area for an adhesive. U.S. Pat. No. 4,762,904 discloses a retaining element, whose contact surfaces are each equipped with a channel for lateral injection of an adhesive.

Adhesives with moduli of elasticity in the range from approx. 8 to 15 MPa are customary for attaching retaining elements on side windows.

SUMMARY

There is a need for vehicle side windows with improved retaining elements and for improved methods for attachment of the retaining elements. The object of the present invention is to provide such improved side windows and methods. The retaining elements should be able to be attached to the side windows as quickly and as easily as possible (in particular, without the use of a sealing device), enable high flexibility of positioning, and adhere securely and stably to the side window.

The object of the present invention is accomplished according to the invention by a side window in accordance with claim 1. Preferred embodiments are apparent from the dependent claims.

In an aspect of the invention, there is provided a side window for a vehicle, having a first surface, a second surface opposite thereto, and a lower edge, and having at least one retaining element attached in a region of the lower edge, wherein the retaining element has a contact section with a contact surface for securing to the side window and a securing section connected to the contact section for securing to the vehicle, and wherein the retaining element is secured to the side window on one side, by connecting the contact surface to the first surface via an adhesive, wherein the adhesive has a thickness of at least 1 mm and a modulus of elasticity of at least 150 Mpa.

In another aspect of the invention, there is provided a method for producing a side window having a retaining element for a vehicle, comprising:
 providing a retaining element that has a contact section with a contact surface and a securing section connected to the contact section, and a side window having a first surface, a second surface opposite thereto, and a lower edge, and
securing the retaining element to the side window on one side in the region of the lower edge, by connecting the contact surface to the first surface via an adhesive, wherein the adhesive has a thickness of at least 1 mm and a modulus of elasticity of at least 150 MPa

BRIEF DESCRIPTION OF THE DRAWINGS

In the following, the invention is explained in detail with reference to drawings and exemplary embodiments. The drawings are a schematic representation and not to scale. The drawings in no way restrict the invention.

They depict.

DETAILED DESCRIPTION

Figure 1:
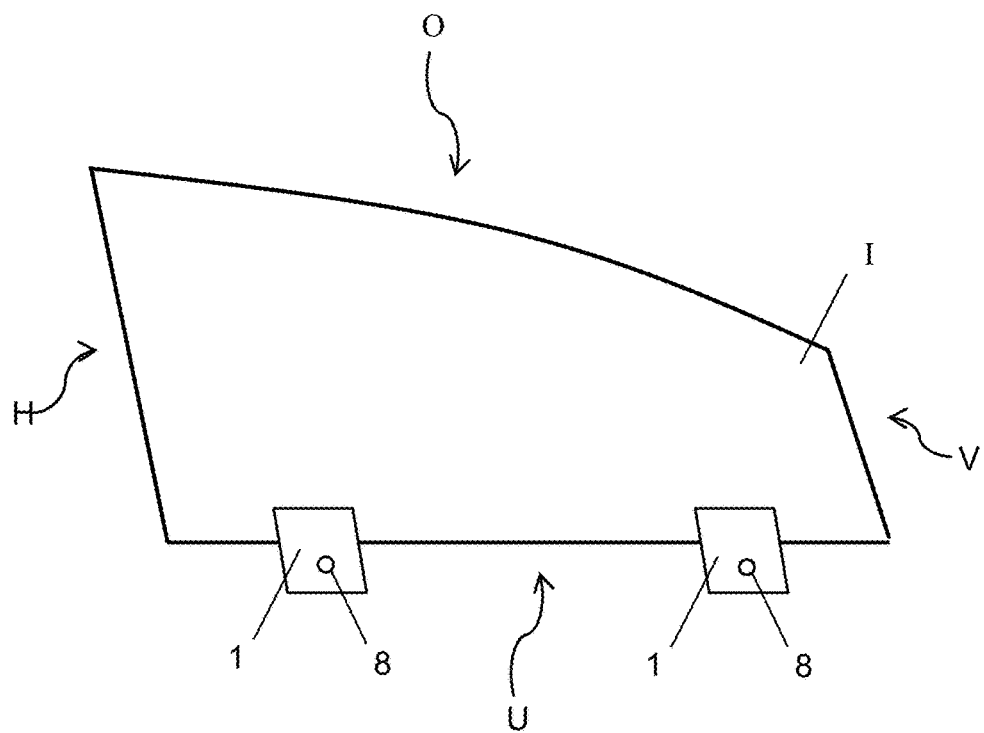
FIG. 1 a plan view of a side window with two generic retaining elements.

The invention comprises a pane assembly, comprising a side window for a vehicle and a retaining element attached thereon on one side. The side window is intended, as a vehicle side window, for separating a vehicle interior from an external environment. The side window has an upper edge, a lower edge, a front edge, and a rear edge. "Upper edge" refers to the side edge of the side window that points upward in the installed position. "Lower edge" refers to the side edge that points downward toward the ground in the installed position. "Front edge" refers to the side edge that is oriented forward in the direction of travel. "Rear edge" refers to the side edge that is oriented backward in the direction of travel. The side window also has a first surface (primary surface) and a second surface (primary surface) opposite the first surface, between which said edges extend.

At least one retaining element is attached to the side window in the region of the lower edge. This means that a region adjacent the lower edge is covered by the retaining element and that the retaining element extends from there beyond the lower edge. The retaining element according to the invention comprises at least one contact section for securing to the side window and a securing section connected thereto, in particular rigidly connected thereto, for securing to the vehicle. The contact section is adhesively secured to the first surface of the side window. The contact section has a contact surface, which intentionally faces or is directed toward the first surface of the side window. The contact surface is connected to this first surface via a layer of an adhesive. The securing section intentionally protrudes beyond the lower edge of the side window and is intended and suitable for securing to the vehicle. For this purpose, the securing section is connected to a raising and lowering mechanism of the side window within the vehicle body.

According to the invention, the retaining element is secured to the side window on one side. This means that the retaining element is connected only to the first surface of the side window (and possibly to the lower edge), but not to the opposite second surface. The retaining element typically has exactly one single contact section, which is rigidly connected to the securing section. However, in principle, the retaining element can also have a plurality of contact sections, which are, however, all secured to the same first surface of the side window.

Conventional retaining elements are typically secured to the side window via adhesive layers of less than 1 mm thickness. In contrast, according to the invention, thicker adhesive layers are used. The thickness of the adhesive layer is at least 1 mm, preferably at least 2 mm. According to the invention, the adhesive is a high-modulus adhesive with a modulus of elasticity of at least 150 MPa, preferably from 150 MPa to 600 MPa.

As a result of the securing section extending lever-like from the lower edge of the pane, with conventionally attached retaining elements, the position of the connection relative the raising and lowering mechanism is also subject to variation and can sometimes deviate considerably from the intended position. The thicker adhesive layer and the resultant greater distance between the pane surface and the contact section ensure a high degree of flexibility in terms of the orientation of the retaining element. For example, the retaining element can be positioned such that the relative position of the securing section corresponds to the desired ideal position regardless of the edge curvature of the pane in the individual case. Any deviations in the pane curvature are compensated by the thick adhesive portion. Production variations in terms of the position of the securing section can thus be reduced. Since the retaining element is secured only on one side, the space requirement in the vehicle body is not increased by the thicker adhesive layer compared to conventional retaining elements secured on both sides. Due to the increased distance between the pane surface and the contact section, the adhesive exerts a great influence on the overall rigidity of the pane assembly. The high modulus of elasticity ensures rigidity and stability. These are major advantages of the present invention.

The side window according to the invention is preferably an openable, in particular raisable and lowerable, side window of a motor vehicle, in particular of a passenger car. This means a pane for a side window that can be opened and closed again by substantially vertical displacement of the side window into the car body. Typically, the side window is provided with a plurality of, in particular two, retaining elements that are mounted in the region of the lower edge, where they are hidden in the vehicle body in the open state and also in the closed state of the window. The side window can be frameless or framed. A framed side window has a complete body frame around the window opening such that, in the closed state, all side edges of the side window are overlapped within the vehicle body—when raised, the side window is, so to speak, guided into the body frame. In the case of a frameless side window, there is no such body frame. Instead, the upper edge, the front edge, and the rear edge of the side window are exposed in the closed state.

The thickness of the adhesive layer between the pane surface and the contact section is preferably from 1 mm to 5 mm, particularly preferably from 2 mm to 4 mm. Thus, variations in terms of the edge curvature of the side window can be effectively compensated, while, at the same time, sufficient rigidity and stability are ensured.

The adhesive preferably has a modulus of elasticity of at least 300 MPa, particularly preferably from 400 MPa to 600 MPa. This ensures special stability of the connection of the side window to the retaining element. This advantage is particularly significant in the case of frameless side windows, in which the connection between the side window and the retaining element is particularly stressed, for example, by forces acting in the direction of the rear edge caused by the wind. Suitable high-modulus adhesives are, for example, polyurethane, acrylate, or epoxy adhesives.

Typically, the contact section is connected, in particular rigidly connected, to the securing section via a step section. The step section causes the securing section to be offset relative to the contact section, in particular in the direction in which the contact surface faces. To produce the offset, the angles between the step section and the contact section and the angles between the step section and the securing section are greater than 0° and less than 180°, typically greater than or equal to 45° and less than 180°. The lateral offset between the contact section and the securing section enables arranging the securing section protruding beyond the lower edge of the side window in the plane of the side window in the installed position. In other words, the securing section is directed toward the lower edge of the side window. This is advantageous in terms of the position of the center of gravity and the space required in the vehicle body.

In a first embodiment of the side window according to the invention, the retaining element has at least one, preferably exactly one filling opening. This means a passage through the retaining element that is intended and suitable for injecting adhesive from the side of the retaining element facing away from the side window through the retaining element into the intermediate space between the contact section and the pane surface. Such filling openings are also common in prior art retaining elements. The area of the filling opening is typically from 0.5 mm$^2$ to 25 mm$^2$, preferably from 2 mm$^2$ to 12 mm$^2$. The filling opening can be in the contact section or in the step section or even span the boundary between the two regions.

In an advantageous further development of the first embodiment, the contact surface of the contact section has at least one channel. In the context of the invention, "channel" refers to an elongated depression made in the contact surface, which otherwise spans a flat or curved surface, in particular is flat. According to the invention, the channel is provided to influence the flow behavior, in particular the flow direction, of an adhesive injected into the intermediate space between the contact section and the side window and can, therefore, also be referred to as a flow channel. The channel is, in particular, intended to improve the distribution of the adhesive over the contact surface. To ensure sufficient wetting of the contact surface and of the part of the pane surface opposite it, in prior art retaining elements either the intermediate space between the contact surface and the pane surface must be sealed or a considerable escape of adhesive from the intermediate space must be accepted and subsequently removed. The at least one flow channel results in improved distribution of the adhesive over the contact surface such that its sufficient wetting is achieved without adhesive escaping or at least with greatly reduced leakage of adhesive. Thus, it is possible to dispense with sealing the intermediate space between the contact section and the side window or with subsequent processing for removal of excess adhesive, which decisively simplifies and accelerates the production process. The at least one channel is preferably directed toward the filling opening such that the adhesive is distributed over the contact surface starting from the filling opening. In other words, the channel points toward the filling opening. The channel can extend all the way to the filling opening; alternatively, the channel ends facing the filling opening can have a distance from the filling opening.

The at least one channel is arranged in the contact surface such that an adhesive injected through the filling opening into the intermediate space is distributed more evenly over the contact surface compared to a retaining element with a conventional contact surface with no channel. In particular, at least 95% of the contact surface and of the region of the pane surface opposite it should be wetted with adhesive before the adhesive begins to escape from the intermediate space or flow beyond the contact surface. The geometric arrangement of the channels can be implemented in various ways and can be suitably selected by the person skilled in the art depending on the requirements in the individual case.

In principle, a single channel that runs, for example, around the filling opening like a snail shell can be sufficient. In a preferred embodiment, the contact surface has a plurality of channels. The channels are directed toward the filling opening and distributed in a fan-like manner over the contact surface or a region of the contact surface. This means that the individual channels extend radially between the filling opening and the side edges of the contact surface. The channels can run all the way to the side edges or end before them. Preferably, the channels do not run all the way to the side edges, but, instead, end before them such that the escape of adhesive beyond the contact surface is minimized. The distance of the channel ends from the side edge of the contact surface is preferably from 2 mm to 15 mm, particularly preferably from 3 mm to 8 mm. The channels can extend all the way to the filling opening or have a distance from the filling opening, with the former being preferred.

The contact surface typically has a polygonal, in particular a rectangular shape. In an advantageous embodiment, one channel is associated with at least one corner of the contact surface, toward which it is directed. Preferably, associated in each case with the corner or corners of the contact surface that are farthest from the filling opening is a channel that is directed toward them. Since the filling opening is typically arranged near the edge of the filling opening facing the securing section, said corners are typically the corners of the contact surface facing away from the securing section. The adhesive is then advantageously conveyed into the region of these corners far from the filling opening, significantly improving the homogeneity of the distribution of the adhesive.

The width and depth of the at least one channel can be suitably selected by the person skilled in the art based on the requirements in the individual case. The suitable width and depth depends in particular on the viscosity of the adhesive, with higher viscosity making wider and deeper channels necessary. The width of the channel or the channels is typically from 0.5 mm to 3 mm, preferably from 1 mm to 2 mm. The depth of the channel or the channels is typically from 0.5 mm to 2 mm, preferably from 1 mm to 1.5 mm. Good results are obtained with these values, in particular with the use of a common adhesive with a viscosity from 1 Pa×s to 150 Pa×s. The width and/or the depth of an individual channel can also be variable. For example, it can be advantageous for the width and/or the depth of the channel to be reduced with increasing distance from the filling opening in order to take into account the reduced amount of adhesive to be transported into the outer regions of the contact surface.

In a second embodiment of the side window according to the invention, the retaining element has no filling opening. The contact section and, optionally, the step section preferably have no passages. Since the retaining element according to the invention is applied to the side window only on one side, the adhesive can be applied to the contact surface beforehand and the retaining element can then be positioned precisely on the pane.

The securing section of the retaining element according to the invention typically has a passage (mounting hole) that is intended and suitable for securing to the vehicle. The passage serves specifically for connecting to a raising mechanism (mechanism for raising and lowering the side window) arranged in the vehicle body, typically in a vehicle door, to secure the pane, in particular by inserting a securing section of the raising mechanism, for example, a securing pin, in the passage. The passage is usually essentially circular, for which most prior art securing systems are designed. However, depending on the requirements in the individual case, the passage can also have any other shape, for example, an elliptical shape or even an irregular shape. The size of the passage is usually at least 20 mm$^2$, in particular from 20 mm$^2$ to 2000 mm$^2$, preferably from 80 mm$^2$ to 700 mm$^2$. The passage is ideally roughly circular with a diameter from 5 mm to 50 mm, preferably from 10 mm to 30 mm.

The retaining element is preferably made of a metal, a metal alloy, or a plastic, particularly preferably aluminum, steel, stainless steel, or thermoplastics with or without glass fibers, glass beads, or similar reinforcements as well as blends thereof with additional plastics. Suitable thermoplastics are, for example, polyamides (PA), polybutylene terephthalates (PBT), or polyethylene terephthalate (PET). The retaining element is most particularly preferably made of aluminum, PET, or polyamide 66. Suitable materials are, for example, available ander the tradenames Technyl, Zytel, Ultramid, Schulamid, Ultradur, Arnite, Duranex, Crastin, Bergadur, Pocan, or Grivor. Also conceivable are combinations of the materials mentioned. Preferably, however, the entire retaining element is made in one piece and of the same material. If the retaining element is made of a plastic, this plastic is preferably glass-fiber-reinforced or carbon-fiber-reinforced. For frameless side windows, retaining elements made of metals or metal alloys are preferable due to their greater stability. For side windows including frames, retaining elements made of plastic are preferred due to their lower weight—the lower stability of the plastic retaining elements compared to metal retaining elements is compensated here, in the closed state of the window, by the stabilizing effect of the frame.

The contact section and the securing section are platelike, typically, essentially rectangular, although other shapes are also conceivable. The material thickness of the securing section and the contact section and, optionally, the step section is preferably from 1 mm to 10 mm, particularly preferably from 2 mm to 5 mm, for example, 3.5 mm. This provides good stability without requiring excessive space and excessive material. Preferably, the contact section, the securing section, and, optionally, the step section have the same material thickness.

The width of the contact section, of the securing section, and, optionally, of the step section is preferably from 1 cm to 100 cm, particularly preferably from 2 cm to 15 cm, for example, 10 cm. This provides good stability; in particular, the contact sections provide sufficiently large adhesion surfaces for connecting to the side window.

The length (or height) of the contact section is preferably from 1 cm to 6 cm, particularly preferably from 2 cm to 4 cm, for example, 3 cm. This provides good stability; in particular, the contact sections provide sufficiently large adhesion surfaces for connecting to the side window. The area of the contact section is preferably from 5 cm 2 to 500 cm 2, particularly preferably from 10 cm 2 to 50 cm 2, for example, 30 cm 2.

The length (or height) of the securing section is preferably from 2 cm to 15 cm, particularly preferably from 4 cm to 10 cm, for example, 8 cm. In this range, the securing section is particularly advantageously suited for connecting to conventional mechanisms for raising and lowering the side window. The length of the step section is, for example, from 2 mm to 10 mm.

In the context of the invention, "width" refers to the dimension along the lower edge of the side window in the installed position. "Length" (or height) means the dimension perpendicular thereto, which is arranged substantially parallel to the plane of the side window in the installed position. The contact area of a contact section to the side window, for example, is the product of the length and width of the contact section. The material thickness is the dimension perpendicular to the plane of the side window in the installed position.

The securing section and the contact section can be planar. The curvature of the side window is then compensated by the layer of adhesive. Alternatively, however, the contact section and/or the securing section can also be curved and, thus, be adapted, for example, to the curvature of the side window and reproduce it, and, in the case of the securing section, continue it.

In an advantageous embodiment, the adhesive is a fast curing adhesive such that direct demolding is possible without further stabilization measures. Fast curing can be achieved by mixing two components (2-component adhesive). Other ways are curing by introducing energy from the outside, for example, by heat or light. The so-called "open time" of the two component adhesive is between 0.5 min and 10 min, preferably between 1 min and 5 min. The curing time or setting time of the adhesive until achieving sufficient internal strength is less than 10 min, preferably from 1 min to 5 min. This has the advantage that the position of the retaining element relative to the side window is quickly fixed such that stabilization measures after attachment of the retaining element can be dispensed with. The adhesive can, however, also be a slow curing adhesive.

The side window is, as usual for a vehicle window, preferably curved such that the interior-side surface is concave and the exterior-side surface is convex. "Exterior-side surface" refers to the surface that faces the outside environment in the installed position. "Interior-side surface" refers to the surface that faces the interior in the installed position. In the context of the invention, the first surface can be the interior-side or the exterior-side surface, preferably the interior-side surface.

In one embodiment, the side window is single-pane safety glass (ESG). In this case, the side window is made of a single glass pane that is thermally or chemically toughened (tempered). The thickness of the glass pane is preferably from 2 mm to 5 mm.

In another embodiment, the side window is a laminated pane (VSG: laminated safety glass). The laminated pane comprises a first glass pane and a second glass pane that are joined to one another via a thermoplastic intermediate layer. The panes can also be referred to as outer pane and inner pane: the inner pane facing the interior in the installed position and the outer pane facing the external environment in the installed position. The exposed surfaces of the side window to which the retaining element is bonded are the surfaces of the individual panes that face away from the intermediate layer, i.e., exterior-side surface of the outer pane and the interior-side surface of the inner pane. The outer pane and the inner pane preferably have a thickness from 1 mm to 5 mm, wherein the thickness of the two panes can be the same (symmetrical panes) or also different (asymmetrical panes). The thickness of the intermediate layer is preferably from 0.3 mm to 2 mm, particularly preferably from 0.5 mm to 1 mm. The intermediate layer is typically made of a polymer film, preferably made of or based on polyvinyl butyral (PVB), ethylene vinyl acetate (EVA), or polyurethane (PU). To improve the thermal comfort in the vehicle, the intermediate layer can be made of a noise-reducing polymer film, typically comprising at least three plies, wherein the middle ply has higher plasticity or elasticity than the outer plies surrounding it, for example, as a result of a different plasticizer content.

The glass pane or glass panes is/are preferably made of soda lime glass, as is customary for window panes. The glass panes can be clear and colorless, but also tinted, cloudy, or colored.

The invention also includes a vehicle with a raising mechanism for an openable side window arranged within the car body and a side window according to the invention, wherein the raising mechanism is attached to the securing section of the retaining element or the retaining elements, preferably via a holder in the passage through the securing section.

The invention also includes a method for producing a side window having a retaining element for a vehicle. Provided are a side window and a retaining element according to the invention. The retaining element has a contact section with a contact surface and a securing section connected to the contact section. The side window has a first surface, a second surface opposite thereto, as well as a lower edge, an upper edge, a front edge, and a rear edge. The retaining element is secured to the side window on one side in the region of the lower edge by connecting the contact surface to the first surface via an adhesive. The adhesive has a thickness of at least 1 mm and a modulus of elasticity of at least 150 MPa.

In a first preferred embodiment of the method, the adhesive is applied only to a central region of the contact surface. The adhesive has a distance from the side edges of the contact surface of at least 2 mm, preferably from 2 mm to 10 mm. Thus, a circumferential edge region of the contact surface remains free of adhesive. Then, the retaining element is placed against the first surface, in particular pressed on. The adhesive is distributed over the contact surface as a result of the contact pressure. With suitable dimensioning of the amount of adhesive, the adhesive does not escape from the intermediate space between the respective contact section and the associated pane surface. The appropriate amount of adhesive depends on the intended distance between the pane surface and the contact section and on the size of the contact surface and can be determined by the person skilled in the art by simple calculations or preliminary tests. It is a particular advantage of the one-sided retaining element according to the invention that the contact surface is accessible and the adhesive can be specifically distributed thereon In this first embodiment, no filling opening for injection of adhesive is necessary and, consequently, is preferably not present.

In an advantageous variant of the first embodiment, the adhesive is a fast curing adhesive. As a result, the position of the retaining element relative to the side window is fixed sufficiently quickly such that measures for temporary positional stabilization during the curing of the adhesive can be dispensed with. The production process is thus simplified and accelerated.

In an advantageous variant of the first embodiment, the adhesive is a slow curing adhesive. In order to prevent displacement of the retaining element prior to complete curing of the adhesive, measures should be taken for temporary positional stabilization. This can advantageously be achieved by a second adhesive, for example, a hot-melt adhesive that is applied in the edge region of the adhesive surface free of actual adhesive, for example, at points in the corners of the adhesive surface. The fast curing second adhesive secures the position of the retaining element, while the actual adhesive cures. Since the connection between the side window and the retaining element is usually not subjected to greater forces during the curing than the force of gravity acting on the retaining element, the demands on the adhesive force of the second adhesive are comparatively low.

In a second preferred embodiment of the method, the retaining element has a filling opening for injecting the adhesive into the intermediate space between the contact section and the first surface of the side window. The contact surface has at least one channel, which is directed toward the filling opening and is suitable for influencing the flow direction of the adhesive. The filling opening and the channel have already been described in greater detail in connection with the side window according to the invention, to which reference is made here. The retaining element is arranged in the desired position relative to the side window, with the contact surface of the contact section directed toward the first surface of the side window. Here, the "desired position" refers to the intended arrangement of the retaining element relative to the side window that the completely assembled retaining element is intended to take. Then, the adhesive is injected into the intermediate space between the contact surface and the first surface of the side window through the filling opening. The at least one channel of the contact surface causes homogeneous distribution of the adhesive. The adhesion surfaces can thus be wetted sufficiently without a critical amount of adhesive escaping from the intermediate space between the contact surface and the pane surface. The method can therefore advantageously be carried out without sealing the intermediate space.

In both preferred embodiments, escape of adhesive from the intermediate space between the pain surface and the contact surface can be avoided, either by the appropriate amount of adhesive applied beforehand in the central region of the contact surface or by the guiding effect of the channels on the injected adhesive. Consequently, it is unnecessary to seal said intermediate space to prevent the escape of adhesive. Preferably, no measures are therefore taken for sealing the intermediate space, such as temporary application of a sealing element around the contact section. This advantageously simplifies the method.

Preferably, the side window is arranged and fixed in a tool in a specified position, defined, for example, by reference points on the pane. The retaining element is brought into the desired position, for example, with an assembly aid or a robot. The position of the retaining element is selected such that the securing sections of the completely assembled retaining element are arranged in the desired position relative to the pane.

The retaining element itself is produced by methods customary in the art. Retaining elements made of plastic are preferably made by injection molding; retaining elements made of metal or metal alloys are made, for example, by punching, rolling, and/or welding. The channels can, for example, be formed directly by the injection mold or can be introduced by subsequent processing.

The invention moreover includes the use of a side window according to the invention as an openable side window of a motor vehicle, preferably a passenger car, wherein the retaining element is used for securing to a raising mechanism in the vehicle body.

FIG. 1 depicts a plan view of a generic side window I, which is intended as an openable side window for the front side window of a passenger car. Two retaining elements 1, which are intended for connecting to a raising mechanism within the vehicle door, are attached in the region of the lower edge U of the side window. For this, the retaining elements 1 have passages 8 to which the raising mechanism can be secured.

Figure 2:
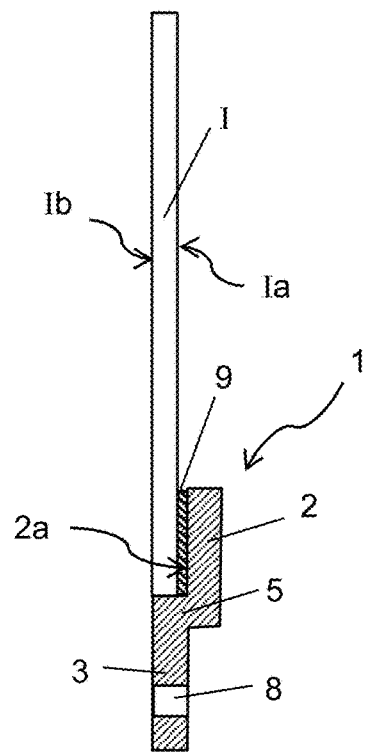
FIG. 2 a cross-section through a side window according to the invention.

FIG. 2 depicts a cross-section through an embodiment of the side window I according to the invention with the retaining element 1. The retaining element 1 is attached to the side window I on one side. The retaining element 1 is composed of a single contact section 2, which is secured to the first surface Ia of the side window I. For this purpose, the contact surface 2a of the contact section 2 facing the side window I is bonded to the surface Ia via a layer of an adhesive 9. A securing section 3 with the passage 8 is connected to the contact section 2 via a step section 5. The retaining element 1 covers a region of the lower edge U and a region of the surface Ia adjacent thereto. The securing section 3 protrudes beyond the lower edge U of the side window I, is offset laterally relative to the contact section 2 such that it is arranged roughly in the plane of the side window I, and is directed toward its lower edge U him The retaining element 1 is made in one piece from glass-fiber-reinforced polyamide 66. The contact section 2, the securing section 3, and the step section 5 have a thickness D (material thickness) of 3 mm. The width B of the retaining element 1 is, for example, 80 mm. The length L of the contact section 2 is, for example, 30 mm. The length L of the securing section 3 is, for example, 50 mm.

The adhesive 9 is, for example, DOW Betaforce 9050S with a modulus of elasticity of 400 MPa, elongation at break of 80%, tensile strength of 15 MPa, and pot life of 6 min. The thickness of the adhesive layers is, for example, 3 mm.

The side window I is, for example, implemented as single-pane safety glass (ESG) made of 3.85-mm-thick soda lime glass. For the sake of simplicity, the side window I is depicted flat in the figure; however, in reality, it has a curvature as is usual for passenger car windows.

Figure 3:
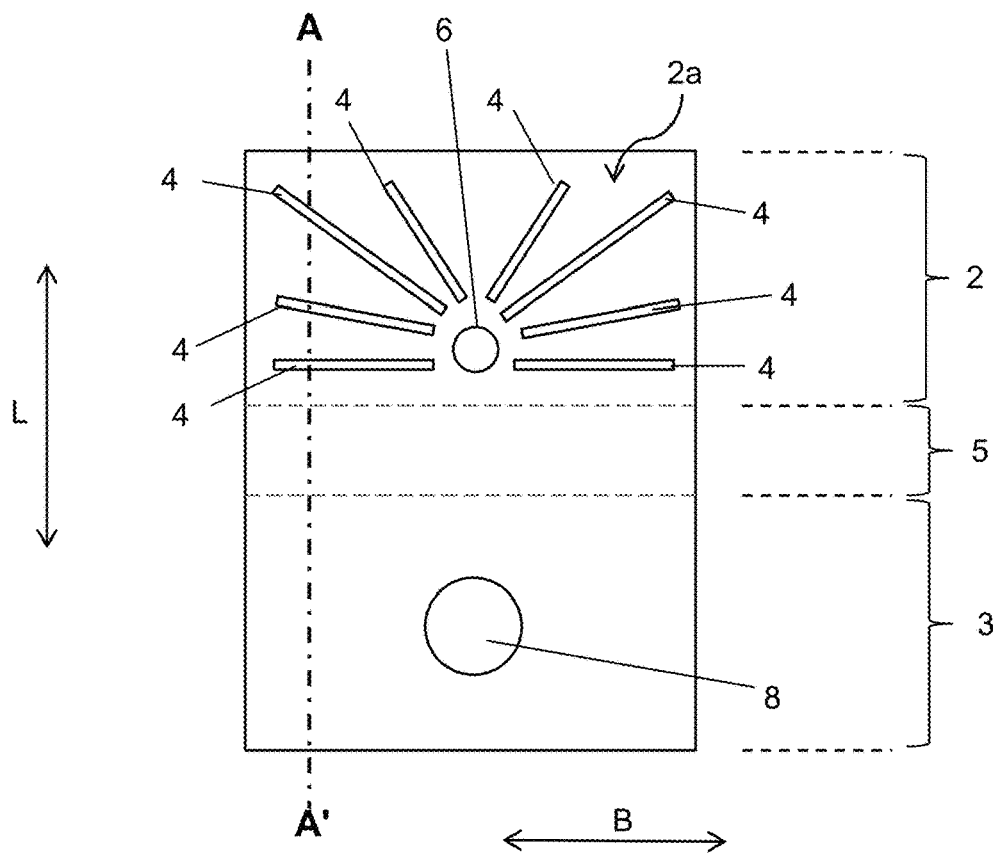
FIG. 3 a plan view of the surface of an embodiment of the retaining element 1 facing the side window I, FIG. 4 a section A-A' through the retaining element 1 of FIG. 3, FIG. 5 a cross-section through another embodiment of the side window, FIG. 6 a plan view of the surface of another embodiment of the retaining element 1 facing the side window I, FIG. 7 a flow chart of an embodiment of the method according to the invention, and FIG. 8 flow chart of another embodiment of the method according to the invention.

FIG. 3 depicts a plan view of the side of an embodiment of the retaining element 1 according to the invention facing the side window I with the securing section 3 together with the passage 8, the step section 5, and the contact section 2. In the plan view, the contact surface 2a of the contact section 2, which is connected to the side window I, can be seen. The contact surface has, near the edge facing the step section 5, a filling opening 6 through which an adhesive is injected into the intermediate space between the side window I and the contact section 2 during assembly of the retaining element 1. A plurality of channels 4 are introduced into the contact surface 2a. The channels 4 are provided to distribute the adhesive injected through the filling opening 6 as homogeneously as possible over the contact surface 2a. Thus, good wetting of the contact surface 2a and of the region of the surface Ia opposite it are achieved without the risk of excess adhesive escaping from the intermediate space, which had to be prevented in prior art retaining elements 1 by a sealing device or remedied by post-processing. The channels 4 are straight and are directed, on the one hand, toward the filling opening 6 and, on the other, toward the side edge of the contact surface 2a. The channels 4 are distributed in a fan-like manner around the filling opening 6 and run radially between the filling opening 6 and the side edge of the contact surface 2a to distribute the adhesive.

The filling opening 6 could alternatively also be arranged in the step section 5 or on the boundary between the contact section 2 and the step section 5.

In the figure, arrows indicate the dimensions of the width B and the length L in the context of the invention.

Figure 4:
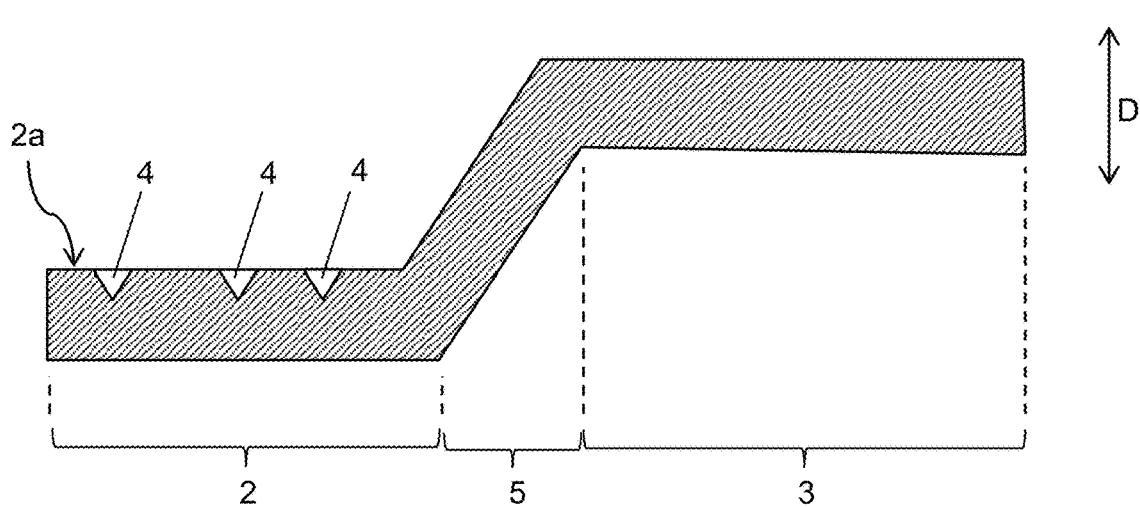

FIG. 4 depicts a section along A-A' through the retaining element 1 of FIG. 3. In addition, an arrow indicates the dimension of the thickness D (material thickness) in the context of the invention. The channels 4 that are introduced into the contact surface 2a are seen. They have, for example, a width of 1.5 mm and a depth of 1 mm.

Figure 5:
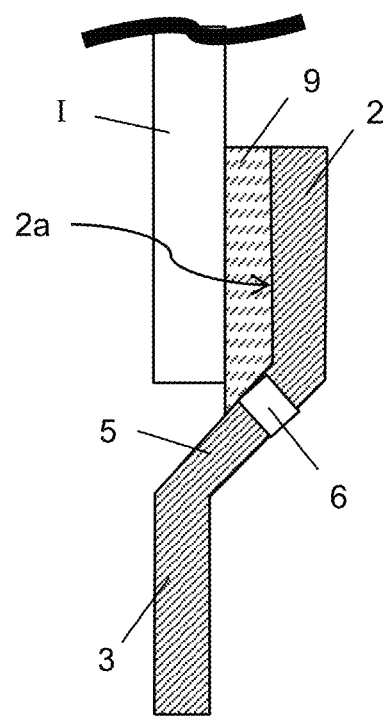

FIG. 5 depicts a cross-section through a side window I according to the invention with another embodiment of the retaining element 1. Here, the filling opening 6 for injecting the adhesive 9 is arranged in the step section 5. In this case, it can be advantageous for the distribution of the adhesive 9 for the channels 4 to continue beyond the contact section 2 into the step section 5.

Figure 6:
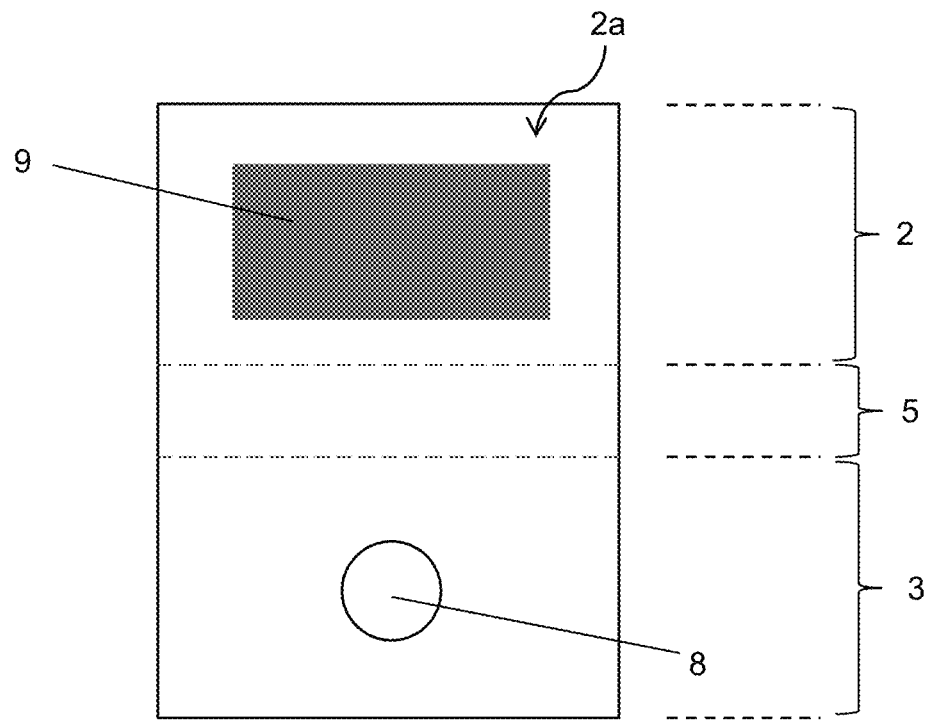

FIG. 6 depicts a plan view of the side of another embodiment of the retaining element 1 according to the invention of the side window I with the securing section 3 including the passage 8, the step section 5, and the contact section 2. Discernible in the plan view is the contact surface 2a of the contact section 2 which is connected to the side window I. A layer of the adhesive 9 is applied on the contact surface 2a. The adhesive 9 is applied only in a central region of the contact surface 2a such that a circumferential edge region with a width of 5 mm of the contact surface 2a remains free. When the retaining element 1 is glued on, the adhesive 9 can be distributed over this free surface such that it does not escape from the intermediate space between the side window I and the contact section 2.

FIG. 7 depicts a flow chart of an exemplary embodiment of the method according to the invention for producing a side window according to the invention with a retaining element. Since the uniform distribution of the adhesive 9 is ensured by the channels 4, the sealing of the intermediate space between the retaining element 1 and the side window I can be dispensed with at the time of injection of the adhesive 9.

FIG. 8 depicts a flowchart of another embodiment of the method according to the invention for producing a side window according to the invention with a retaining element. The central arrangement of the portion of the adhesive 9 ensures that no adhesive 9 escapes from the intermediate space between the retaining element 1 and the side window I. Consequently, measures for sealing the intermediate space can be dispensed with.

LIST OF REFERENCE CHARACTERS (1) retaining element for a side window of a vehicle
(2) contact section of the retaining element 1
(2a) contact surface of the contact section 2
(3) securing section of the retaining element 1
(4) channel
(5) step section of the retaining element 1
(6) filling opening
(8) passage through the securing section 3
(9) adhesive
I side window of a vehicle
Ia first surface of the side window I
Ib second surface of the side window I
(O) upper edge of the side window I
(U) lower edge of the side window I
(V) front edge of the side window I
(H) rear edge of the side window I
(L) length/height
(B) width
(D) thickness/material thickness
A-A' section line

The invention claimed is:

1. A side window for a vehicle, having a first surface, a second surface opposite thereto, and a lower edge, and having at least one retaining element attached in a region of the lower edge,
   wherein the retaining element has a contact section with a contact surface which faces toward the first surface for securing to the side window and a securing section connected to the contact section for securing to the vehicle, and
   wherein the retaining element is secured to the side window on only one main side of the side window, by connecting the contact surface to the first surface via an adhesive arranged at least in a central region of the contact surface, wherein the adhesive has a thickness of at least 1 mm and a modulus of elasticity of at least 150 MPa so that the contact surface is spaced apart from the first surface by the adhesive,
   wherein the contact section is connected to the securing section via a step section, and the step section causes the securing section to be offset relative to the contact section, such that in the installed position, the securing section is aligned with the lower edge of the side window and a plane of a first main surface of the securing section is arranged in a plane of the second surface of the side window,
   wherein the contact surface extends over the complete contact section and the contact surface is directly connected to the first surface via the adhesive so that the retaining element is secured to the side window with only said adhesive,
   wherein the second surface and the lower edge of the side window are out of contact with the adhesive and the retaining element, and
   wherein a first angle between the step section and the contact section and a second angle between the step section and the securing section are each greater than or equal to 45 degrees so that a distance that separates the lower edge of the side window from the retaining element increases along the step section and in a direction from the contact section to the securing section.

2. The side window according to claim 1, wherein the thickness of the adhesive is at least 2 mm.

3. The side window according to claim 2, wherein the thickness of the adhesive is from 2 mm to 4 mm.

4. The side window according to claim 1, wherein the adhesive has a modulus of elasticity of 150 MPa to 600 MPa.

5. The side window according to claim 4, wherein the modulus of elasticity is from 400 MPa to 600 MPa.

6. The side window according to claim 1, wherein the retaining element has a filling opening for injecting an adhesive into the intermediate space between the contact section and the first surface of the side window.

7. The side window according to claim 6, wherein the contact surface has at least one channel, which is directed toward the filling opening and is suitable for influencing the flow direction of the adhesive.

8. The side window according to claim 6, wherein the contact surface has a plurality of channels, which are directed toward the filling opening and are radially extending towards the filling opening.

9. A method comprising utilizing a side window according to claim 1,
   wherein the vehicle is a motor vehicle and wherein the side window is an openable side window of the motor vehicle.

* * * * *